United States Patent [19]

Mangum et al.

[11] Patent Number: 5,197,575
[45] Date of Patent: Mar. 30, 1993

[54] SMALL VEHICLE BRAKING SYSTEM

[76] Inventors: U. Stancel Mangum, 838 E. 6600 South; Kim S. Mangum, 375 E. Brahma Dr., both of Murray, Utah 84107; Michael L. Mangum, 7270 Nina Cir.; Kent B. Mangum, 7504 Blackfriars Cir., both of West Jordan, Utah 84084

[21] Appl. No.: 783,939

[22] Filed: Oct. 29, 1991

[51] Int. Cl.⁵ .............................................. F16D 55/08
[52] U.S. Cl. ...................................... 188/72.9; 188/80
[58] Field of Search ................. 188/2 R, 18 R, 19, 20, 188/58, 71.1, 72.9, 25, 80

[56] References Cited

U.S. PATENT DOCUMENTS

| | | | |
|---|---|---|---|
| 437,834 | 10/1890 | Kaseberg | 188/72.9 |
| 2,820,529 | 1/1958 | Tack | 188/72.9 |
| 4,374,552 | 2/1983 | Dayen | 188/72.9 |

FOREIGN PATENT DOCUMENTS

| | | | |
|---|---|---|---|
| 1680633 | 1/1970 | Fed. Rep. of Germany | 188/72.9 |
| 0167540 | 10/1982 | Japan | 188/72.9 |

Primary Examiner—Robert J. Oberleitner
Assistant Examiner—Chris Schwartz
Attorney, Agent, or Firm—Thorpe, North & Western

[57] ABSTRACT

A braking system for small vehicles which includes a disc which is connected to the wheel of the vehicle which is to be braked. The disc is connected so that it rotates in a substantially parallel plane to the plane of rotation of the wheel. Two friction pads are each pivotally mounted on one of two tines of a fork structure and are positioned on opposite sides of the disc. A user manually rotates the fork causing the friction pads to be applied against the opposite sides of disc and opposing the rotation of the disc in order to brake the wheel. A spring biases the fork structure to ensure that the friction pads do not contact the sides of the disc when the brake is not being applied.

12 Claims, 1 Drawing Sheet

SMALL VEHICLE BRAKING SYSTEM

BACKGROUND

1. The Field of the Invention

This invention relates to small vehicles. More particularly, the present invention relates to apparatus used to brake small vehicles such as motorized carts used in recreational activities.

2. The Prior Art

Motorized vehicles of all sizes and types share common structures such as a frame, wheels, steering apparatus, engine, and a system to bring the moving vehicle to a stop. In the case of automobiles, trucks, and other motor vehicles driven at highway speeds, a brake system must bring the vehicle to a complete stop regardless of the speed of the vehicle or whether the brakes are wet or dry. The challenge of safely bringing a vehicle weighing a ton or much more to a rapid stop has caused those skilled in the art to develop new braking systems. Such braking systems have evolved from drum brakes to disc brakes then to anti-lock/anti-skid brake systems as well as other braking devices. All of these braking devices have become more complicated as they have increased in their ability to safely bring a large motor vehicle to quick stop.

In contrast, many small recreational vehicles, e.g., those designed to carry one or two persons and travel at relatively slow speeds, weigh so little that they are easily brought to a stop. In such circumstances, it is often a greater concern to provide a braking system which is easily maintained and of low cost. For example, the cost of a state-of-the-art hydraulic anti-lock braking systems would be more than the cost of many entire small recreational vehicles. Thus, while the trend in the industry generally is toward more complex and expensive braking systems, there has been a long felt, but unmet, or long unrecognized, need in the industry for a braking system for small recreational vehicles which is easy to maintain and inexpensive which provide fully adequate performance for such small vehicles.

BRIEF SUMMARY AND OBJECTS OF THE INVENTION

In view of the above described state of the art, the present invention seeks to realize the following objects and advantages.

It is a primary object of the present invention to provide an improved small vehicle braking system which is of simple construction and lower cost than previously available braking systems.

It is another object of the present invention to provide an improved small vehicle braking system which is easy to maintain and is trouble free.

It is still another object of the present invention to provide an improved small vehicle braking system which utilizes the same braking action of previously available disc brakes but without the complexity of the same.

It is also an object of the present invention to provide an improved small motor vehicle braking system which is self adjusting and which produces even wear on the friction pads.

These and other objects and advantages of the invention will become more fully apparent from the description and claims which follow, or may be learned by the practice of the invention.

The present invention provides a braking system for small vehicles whose construction is simple and inexpensive yet still provides suitable braking performance and the advantages which accrue with the use of conventional disc brakes. In the preferred embodiments of the present invention, a disc is provided which is connected to at least one of the wheels of the vehicle which is to be braked. The disc is connected so that it rotates in a substantially parallel plane to the plane of rotation of the wheel.

Two friction pads, which can be fabricated from the same material as commonly available automotive brake pads, are provided. A means is provided for simultaneously moving the first friction pad and the second friction pad in a substantially circular motion about an axis such that the first friction pad contacts and applies pressure to the first side of the disc and the second friction pad contacts and applies pressure to the second side of the disc.

In the described preferred embodiment, the means for simultaneously moving the friction pads is carried out by a fork having two tines, each of the tines having a friction pad pivotally mounted thereon, and the tines are positioned on opposite sides of the disc. An actuation means is provided to allow a user or operator to manually rotate the fork causing the friction pads to be applied against the opposite sides of disc thus braking the rotation of the disc. A return means or biasing means is included to ensure that the friction pads do not contact the sides of the disc when the brake is not being applied.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 1:
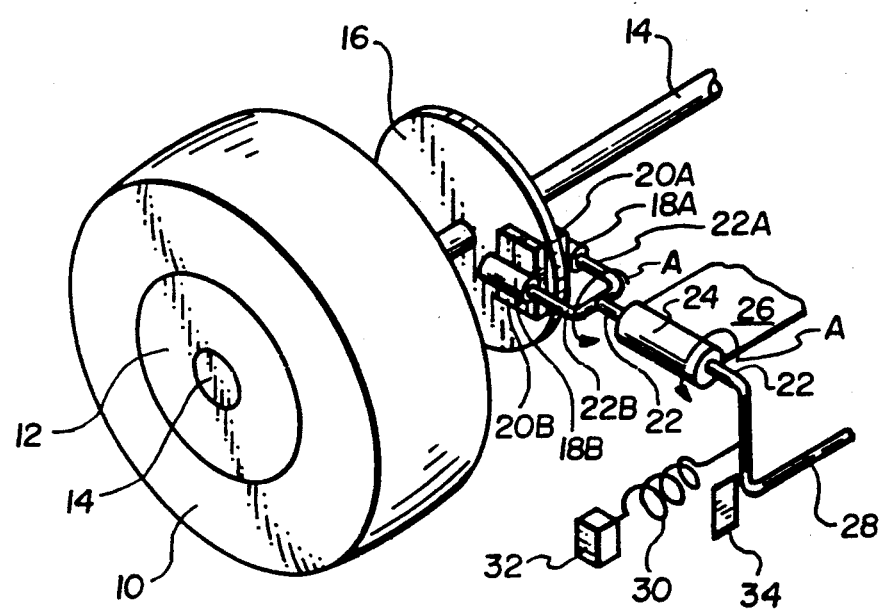
FIG. 1 is a perspective view of the presently preferred embodiment of the braking system.

FIG. 1 is a perspective view of the presently preferred embodiment of the present invention. It will be appreciated that only the pertinent structures of the braking system have been represented in the figures and that the structures of the small vehicle, in which the braking system is installed and which are not represented, are well known in the art. Such small vehicles can be two, three, or four wheeled vehicles powered by some type of engine or the human operator or even propelled by gravity. One type of vehicle which the present invention is well adapted for use with is disclosed in U.S. Pat. No. 4,387,898 issued on Jun. 14, 1983 to U. Stancel Mangum and which is now incorporated herein by reference.

Moreover, it will be appreciated that the present invention has application in other situations requiring braking of a rotating structure. For example, industrial applications regularly require that rotating structures in machines must be provided with an effective and uncomplicated brake.

Represented in FIG. 1 is a tire 10 mounted on a wheel 12. The tire 10 can be the any number of different tires which are used on small vehicles. An axle 14 is rigidly connected to the wheel 12. In most circumstances, the axle will be connected to the drive train (not represented) of the vehicle as is known in the art.

Reference will now be made to both FIG. 2, which is a top view of the pertinent structures represented in FIG. 1, as well as to FIG. 1 in order to best explain the structure and operation of the illustrated embodiment.

Figure 2:
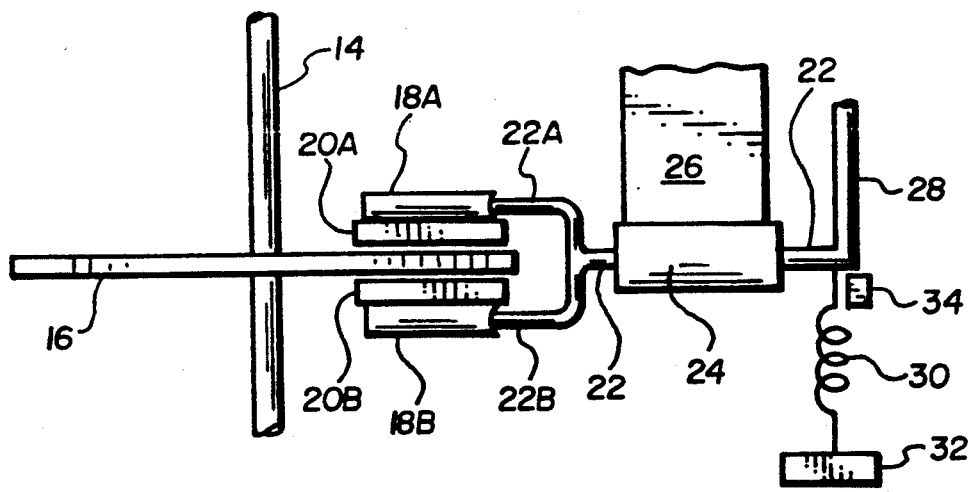
FIG. 2 is a top view of the braking system illustrated in FIG. 1.

In FIGS. 1 and 2, a disc 16 is represented. The disc 16 can be of the type generally available for use in disc brakes used in the industry but can also be made of much less expensive material which provides the necessary friction and heat resistant properties. Because of the structure of the present invention, and the relatively light weight vehicles which it is used with, the disc 16 can be smaller and manufactured to less stringent standards than a disc which would be used on large vehicle brake systems. The disc 16 is mounted on the axle 14.

Illustrated in FIGS. 1 and 2 are a pair of friction pads 20A and 20B, which can be fabricated from the same material used for brake pads in large vehicle brake systems or from some other suitable material. On the back of each of the friction pads 20A and 20B is mounted a sleeve 18A and 18B, respectively.

Each of the sleeves 18A and 18B receives one of two fork tines 22A and 22B, respectively. The sleeves 18A and 18B, in cooperation with the fork tines 22A and 22B, respectively, allow the friction pads 20A and 20B to pivot on the fork tines 22A and 22. Both the sleeves 18A and 18B and the fork tines 22A and 22B can be provided with friction reducing structures such as bearings, washers, or other structures to hold the cooperating structures in place, if desired. Also, it will be appreciated that many equivalent structures can be used. For example, loops, straps, or other arrangements will function equivalently to the sleeves illustrated herein.

The fork tines 22A and 22B join together as a fork shaft 22 which passes through a support sleeve 24. The support sleeve 24 is attached to a support member 26 which is in turn attached to the frame of the vehicle (not shown). An actuator arm 28 is attached to the fork shaft 22. The actuator arm 28 can be connected to a brake pedal or lever (not represented) on the vehicle. Alternatively, those skilled in the art can devise another structure to connect the fork shaft 22 to whatever brake actuation mechanism is used on the vehicle.

Referring now to FIG. 1, as the fork shaft is rotated in the direction of Arrows A, the fork tines 22A and 22B are rotated in a counter-clockwise direction which pushes the friction pads 20A and 20B against the respective sides of the disc 16. The mounting of the friction pads 20A and 20B on fork tines 22A and 22B by way of sleeves 18A and 18B allow the surface of the friction pads 20A and 20B to remain parallel with the surface, of the disc 16. As the operator of the vehicle applies greater torque to the fork shaft 22, greater pressure is applied to the disc 16 and the vehicle is brought to a stop. When the pressure is released, a return spring 30, attached to a fixed support 32, brings the fork shaft 22 to a fully released position against a stop 34.

As will be appreciated, the present invention provides significant advantages over the prior art. The present invention provides a braking action just as previously available disc brakes but without the undue complexity. The present invention is also adaptable for use in many applications where effective braking action is needed using an uncomplicated structure and is particularly useful in small vehicles.

The described apparatus is also self adjusting; as the friction pads wear, whether evenly or unevenly, the pressure applied to the friction pads 20A and 20B automatically compensates the amount of applied pressure to even the wear. The apparatus of the present invention provides a vehicle braking system which is of simple construction and lower cost than previously available braking systems. Moreover, the apparatus of the present invention provides a vehicle braking system which is reliable, which includes few parts, and which is easy to maintain and operates trouble free.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A braking system for small vehicles having a plurality of wheels, the braking system comprising:
   a disc connected to at least one of the wheels so that the disc rotates in a substantially parallel plane to the plane of rotation of the wheel, the disc having a first side and a second side;
   a first friction pad;
   a second friction pad;
   means for simultaneously moving the first friction pad and the second friction pad in a motion about an axis perpendicular to the axis about which the disc rotates and positioned in substantially the same plane as the axis about which the disc rotates such that the first friction pad and the second friction pad move in a substantially circular path from a released position where they do not contact the disc to a second position where the first friction pad applies pressure to the first side of the disc and the second friction pad applies pressure to the second side of the disc, the means for simultaneously moving the first friction pad and the second friction pad comprising a fork structure having a first tine and a second tine, the first tine and the second tine positioned in substantially the same plane;
   actuation means for allowing a user of the vehicle to manually actuate the means for simultaneously moving the first friction pad and the second friction pad; and
   release means for returning the first and second friction pads to their released position when the user releases the actuation means.

2. A braking system as defined in claim 1 wherein the disc comprises a metallic disc.

3. A braking system for small vehicles as defined in claim 1 wherein the means for simultaneously moving the first friction pad and the second friction pad in a motion about an axis comprises:

means for pivotally attaching the first friction pad to the first tine such that a flat contact face on the first friction pad can pivot in relation to the first side of the disc; and means for pivotally attaching the second friction pad to the second tine such that a flat contact face on the second friction pad can pivot in relation to the second side of the disc.

4. A braking system as defined in claim 1 wherein the machine comprises a motorized vehicle.

5. A braking system for small vehicles as defined in claim 4 wherein the motorized vehicles comprise at least three wheels.

6. A braking system for small vehicles as defined in claim 1 wherein the release means comprises a spring.

7. A brake system for use in small recreational vehicles having at least three wheels and carrying at least an operator, the brake system comprising:

a metallic disc rigidly connected to an axle fixed to at least one of the wheels so that the disc rotates in a plane substantially parallel to the plane in which the wheel rotates, the disc having a first flat side and a second flat side;

a fork structure having at least a first tine positioned on the first side of the disc and a second tine positioned on the second side of the disc, the first tine and the second tine being positioned in substantially the same plane;

a first friction pad having a flat contact face;

means for pivotally attaching the first friction pad to the first tine such that the flat contact face can pivot in relation to the first side of the disc;

a second friction pad having a flat contact face;

means for pivotally attaching the second friction pad to the second tine such that the flat contact face can pivot in relation to the second side of the disc;

actuation means for allowing a user to manually rotate the fork structure such that the first and the second tines move in a substantially circular motion about an axis which is substantially perpendicular to an axis about which the disc rotates and positioned in substantially the same plane as the axis about which the disc rotates, the actuation means rotating the fork structure from a released position to an actuated position such that the first and second friction pads contact the first side of the disc and the second side of the disc, respectively; and release means for returning the first and second friction pads to their released position when the user releases the actuation means.

8. A brake system for use in small recreational vehicles as defined in claim 7 wherein the means for pivotally attaching the first friction pad comprises a sleeve mounted on the friction pad, the sleeve pivotally receiving the first tine of the fork structure.

9. A brake system for use in small recreational vehicles as defined in claim 8 wherein the release means comprises a spring connected between the fork structure and a support, the spring placing a biasing force on the fork structure in opposition to the manual rotation of the fork structure.

10. A brake system for use in small recreational vehicles as defined in claim 9 wherein the vehicles comprise motorized vehicles having at least four wheels.

11. A brake system for use in small recreational vehicles as defined in claim 9 wherein the fork structure comprises a shaft to which the first tine and the second tine are attached and the actuation means comprises an arm connected to the fork shaft.

12. A braking apparatus for use in small motorized vehicles carrying at least an operator and having at least three wheels, at least one of the wheels being supported by an axle, the apparatus comprising:

a fork structure having at least a first tine and a second tine, the first tine and the second tine being positioned in substantially the same plane;

a friction pad having a flat contact face;

a first sleeve mounted on the back of the first friction pad, the sleeve receiving the first tine so that the first friction pad can pivot in relation to the fork structure;

a second friction pad having a flat contact face;

a second sleeve mounted on the back of the second friction pad, the sleeve receiving the second tine so that the second friction pad can pivot in relation to the fork structure;

a disc having first and second sides, the disc fixed to the wheel such that it rotates in a plane parallel to the plane of rotation of the wheel and positioned between the first friction pad and the second friction pad;

a third sleeve receiving the shaft of the fork such that as the shaft fork is rotated by the operator the first tine and the second tine are rotated about an axis which is substantially perpendicular to, and positioned in substantially the same plane as, the axis about which the disc rotates and the first and second friction pads are moved from a released position into a contact position with the first and second sides of the disc, respectively, and apply pressure to the disc such that the rotation of the wheel is opposed; and biasing means for returning the first and second friction pads to their released position when the operator releases the shaft of the fork.

* * * * *